US008867437B2

(12) United States Patent
Liu et al.

(10) Patent No.: US 8,867,437 B2
(45) Date of Patent: Oct. 21, 2014

(54) CELL SITE MODEM APPLICATION MESSAGE INTERFACE

(75) Inventors: Zhengwei Liu, San Diego, CA (US); Xiaoxia Zhang, San Diego, CA (US); Christian O. Thelen, San Diego, CA (US); Magnus D. Kretz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 12/913,689

(22) Filed: Oct. 27, 2010

(65) Prior Publication Data

US 2012/0106439 A1    May 3, 2012

(51) Int. Cl.
*H04W 4/00* (2009.01)
*H04L 29/08* (2006.01)
*H04W 76/02* (2009.01)
*H04W 80/02* (2009.01)
*H04W 88/08* (2009.01)

(52) U.S. Cl.
CPC .............. *H04W 80/02* (2013.01); *H04L 69/32* (2013.01); *H04W 88/08* (2013.01); *H04L 69/323* (2013.01); *H04W 76/021* (2013.01); *H04L 69/324* (2013.01)
USPC ........................................................ 370/328

(58) Field of Classification Search
USPC ........................................................ 370/328
See application file for complete search history.

(56) References Cited

U.S. PATENT DOCUMENTS

| 7,639,712 B2* | 12/2009 | Un et al. ........................ 370/469 |
| 2004/0057387 A1* | 3/2004 | Yi et al. ........................ 370/252 |
| 2006/0105710 A1* | 5/2006 | Imamura et al. ................ 455/39 |
| 2007/0067622 A1 | 3/2007 | Nakano et al. |
| 2008/0172172 A1* | 7/2008 | Ng ................................ 701/202 |
| 2009/0161655 A1 | 6/2009 | Uppala |
| 2010/0034169 A1* | 2/2010 | Maheshwari et al. ........ 370/331 |
| 2011/0176477 A1* | 7/2011 | Lee et al. ...................... 370/315 |
| 2012/0236783 A1 | 9/2012 | Park et al. |

FOREIGN PATENT DOCUMENTS

| EP | 0991208 A2 | 4/2000 |
| WO | 0122679 A2 | 3/2001 |
| WO | 2009086222 A2 | 7/2009 |

OTHER PUBLICATIONS

Beyer et al: "A packet radio API", MILCOM 97 Proceedings, Nov. 2, 1997, pp. 1261-1265, vol. 3, IEEE, XP010260764, DOI: 10.1109/MILCOM.1997.644970, ISBN: 978-0-7803-4249-1.
International Search Report and Written Opinion—PCT/US2011/057367—ISA/EPO—Feb. 29, 2012.

\* cited by examiner

*Primary Examiner* — Jay P Patel
(74) *Attorney, Agent, or Firm* — Larry Moskowitz

(57) ABSTRACT

Certain aspects of the present disclosure relate to a technique for implementing a cell site modem application message interface (CSM API) for a cell site of Long Term Evolution (LTE) wireless system.

15 Claims, 8 Drawing Sheets

CELL SITE MODEM APPLICATION MESSAGE INTERFACE

BACKGROUND

1. Field

Certain aspects of the present disclosure generally relate to wireless communications and, more particularly, to implementation of a cell site modem application message interface (CSM API) for Long Term Evolution (LTE) wireless systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In the 3GPP LTE wireless communication system, a cell site modem application message interface (CSM API) can define a message interface and operation scenarios between physical layer (PHY) and Media Access Control (MAC) layer of an LTE base station (cell site). The CSM API may provide a layer of abstraction from low level hardware/firmware details, and may enable communication between a cell site modem (CSM) and software implementing MAC and upper layer functionalities.

SUMMARY

Certain aspects of the present disclosure provide a method for communications. The method generally includes interfacing a lower layer of an apparatus with an upper layer of the apparatus based on exchanging a plurality of messages between the lower layer and the upper layer, grouping information related to at least two of a plurality of apparatuses communicating with the apparatus into one message of the plurality of messages to be sent between the lower layer and the upper layer, and including one or more connection identifiers within one or more messages of the plurality of messages related to setting connection between one or more of the apparatuses and the apparatus.

Certain aspects of the present disclosure provide an apparatus for wireless communications. The apparatus generally includes an interfacing circuit configured to interface a lower layer of the apparatus with an upper layer of the apparatus based on exchanging a plurality of messages between the lower layer and the upper layer, wherein the interfacing circuit is also configured to group information related to at least two of a plurality of apparatuses communicating with the apparatus into one message of the plurality of messages to be sent between the lower layer and the upper layer, and the interfacing circuit is also configured to include one or more connection identifiers within one or more messages of the plurality of messages related to setting connection between one or more of the apparatuses and the apparatus.

Certain aspects of the present disclosure provide an apparatus for wireless communications. The apparatus generally includes means for interfacing a lower layer of the apparatus with an upper layer of the apparatus based on exchanging a plurality of messages between the lower layer and the upper layer, means for grouping information related to at least two of a plurality of apparatuses communicating with the apparatus into one message of the plurality of messages to be sent between the lower layer and the upper layer, and means for including one or more connection identifiers within one or more messages of the plurality of messages related to setting connection between one or more of the apparatuses and the apparatus.

Certain aspects of the present disclosure provide a computer program product. The computer program product generally includes a computer-readable medium comprising code for interfacing a lower layer of an apparatus with an upper layer of the apparatus based on exchanging a plurality of messages between the lower layer and the upper layer, grouping information related to at least two of a plurality of apparatuses communicating with the apparatus into one message of the plurality of messages to be sent between the lower layer and the upper layer, and including one or more connection identifiers within one or more messages of the plurality of messages related to setting connection between one or more of the apparatuses and the apparatus.

Certain aspects of the present disclosure provide an apparatus for wireless communications. The apparatus generally includes at least one processor; and a memory coupled to the at least one processor, wherein the at least one processor is configured to interface a lower layer of the apparatus with an upper layer of the apparatus based on exchanging a plurality of messages between the lower layer and the upper layer, group information related to at least two of a plurality of apparatuses communicating with the apparatus into one message of the plurality of messages to be sent between the lower layer and the upper layer, and include one or more connection identifiers within one or more messages of the plurality of messages related to setting connection between one or more of the apparatuses and the apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
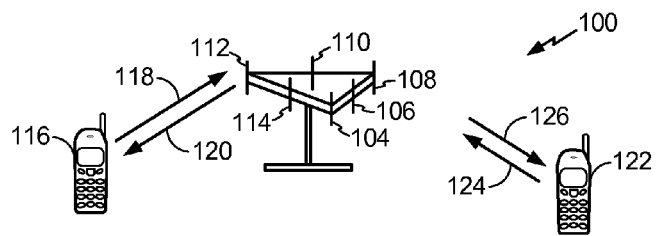
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
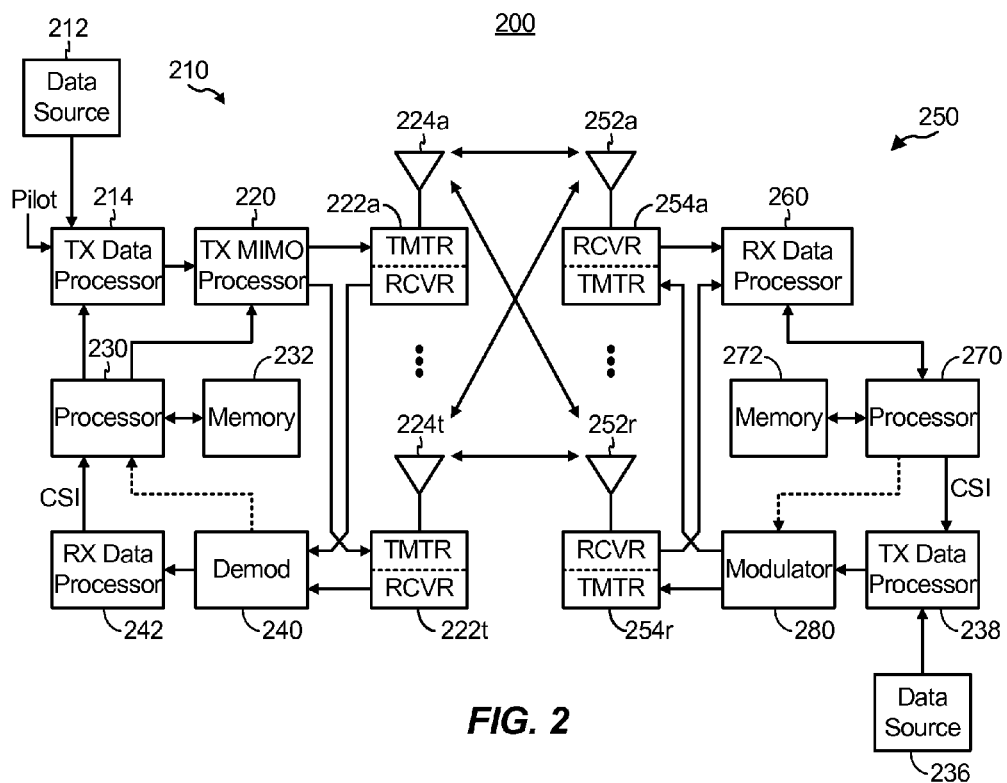
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
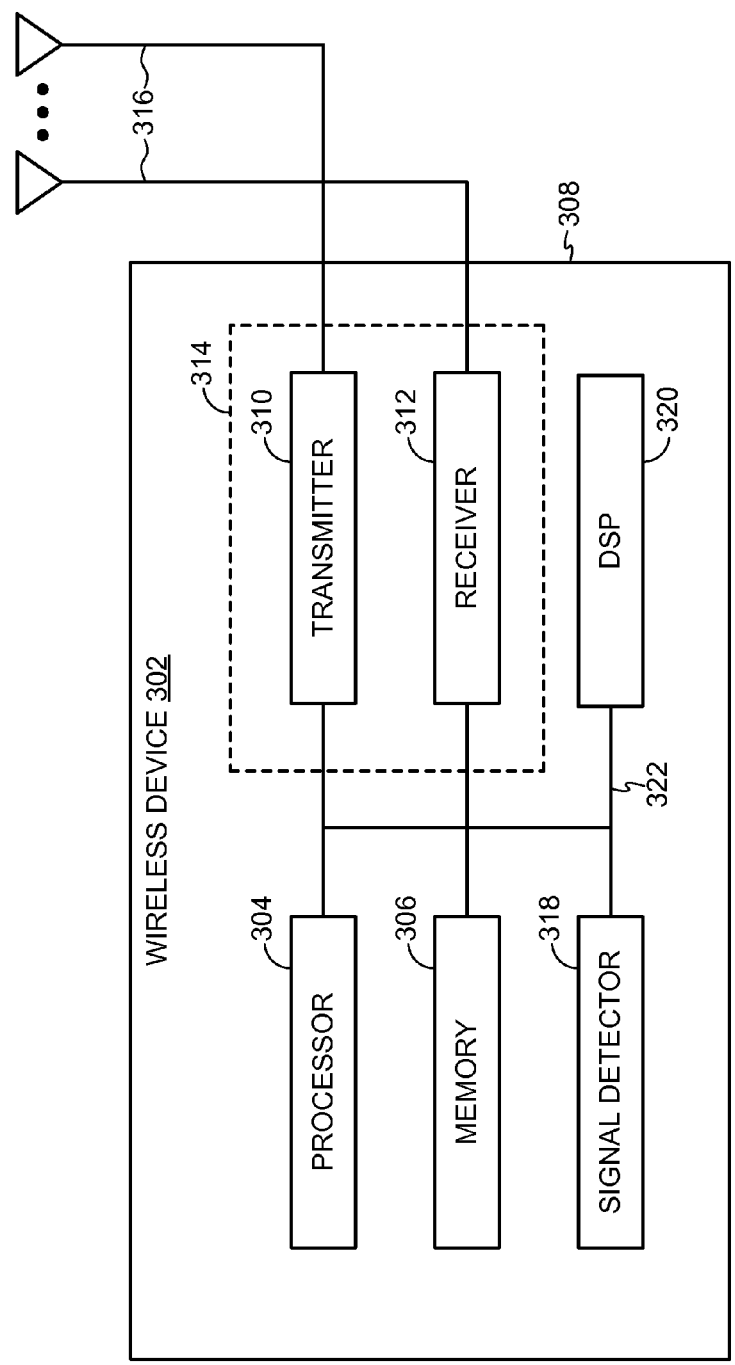
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Cell Site Modem Application Message Interface for Long Term Evolution Wireless Systems The present disclosure proposes an interface messaging protocol and different operation scenarios that may be applied at a cell site modem (CSM) of a Long Term Evolution (LTE) Release-8 (Rel-8) wireless system. For example, the CSM may be an integral part of the base station 100 from FIG. 1, the base station 210 from FIG. 2, and/or the wireless device 302 from FIG. 3. In an aspect, the proposed interface messaging protocol may be implemented as a messaging protocol in accordance with User Datagram Protocol (UDP)/Internet Protocol (IP), and it may support management of a physical layer within the LTE base station.

The interface between upper layer software (SW) and the CSM can be referred to as a 'cell site modem application message interface' (CSM API). The CSM API may provide a layer of abstraction from the LTE physical layer of hardware/firmware details, and may enable communication between the CSM and the SW implementing media access control (MAC) and upper layer functionalities.

Figure 4:
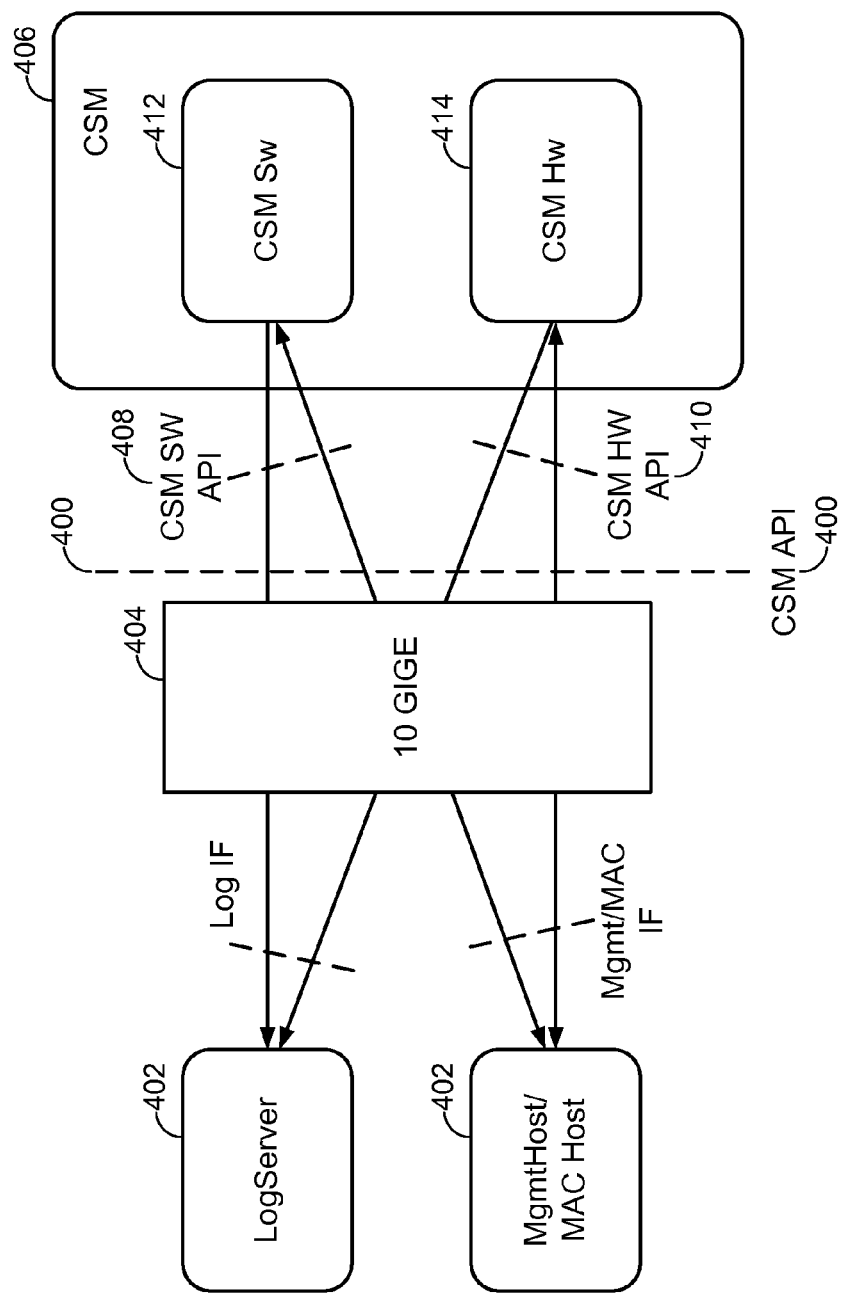
FIG. 4 illustrates an example cell site modem application message interface (CSM API) in accordance with certain aspects of the present disclosure.

FIG. 4 illustrates an example CSM API 400 in accordance with certain aspects of the present disclosure. In an aspect, all information may flow from an upper layer SW 402 across an interface 404 to a lower layer CSM 406. The CSM API 400 may be further characterized as CSM SW API 408 and CSM Hardware (HW) API 410. As illustrated in FIG. 4, the CSM SW API 408 may comprise an interface with CSM SW 412, and the CSM HW API 410 may comprise an interface with CSM HW 414. The CSM API 400 may support both Frequency Division Duplex (FDD) and Time Division Duplex (TDD) operational modes of LTE Rel-8 wireless systems.

The CSM API proposed in the present disclosure may divide functionalities between a lower layer (e.g., Layer 1 (L1)) and an upper layer (e.g., Layer 2 (L2)) of an LTE cell site (base station). The CSM API may be implemented such that to minimize or reduce duplication of functions on each interfaced side. The CSM API may be reducing a number of messages exchanged between two layer entities by bundling into one message information related to multiple user equipments (UEs) supported by the LTE Rel-8 wireless system. Also, the CSM API may be implemented such that to reduce the number of exchanged messages between L1 and L2, which may be achieved by skipping resending a message if the information within the message is unchanged from the last time the message was sent.

Certain aspects of the present disclosure support designing error proof API attributes by eliminating illegal inputs through 'enumeration' type and range checking. In an aspect, the attributes may be grouped based on the common functionality.

As illustrated in FIG. 4, the message based distributed architecture may be deployed at the cell site. The L1 SW 412, L1 HW 414, and upper layer SW 402 may all communicate through the IP based messaging protocol. The CSM API 400 may minimize an amount of information passing through the interface. In an aspect, the CSM API 400 may be able to choose the shortest communication path for transferring information from a source entity to a destination entity.

In an aspect, the proposed CSM API may minimize a number of UE entries in a UE database stored at the cell site. This may be achieved by introducing a smaller range of values of connection identifiers and by establishing one-toone mapping between connection identifier and Radio Network Temporary Identifier (RNTI) belonging to the same message of the CSM API. In an exemplary case, the RNTI may comprise 16 bits and the size of UE database may be approximately 1K bits.

In an aspect, the proposed CSM API may support multiple cells per eNB, as well as a single cell per eNB. In an aspect, the CSM API may support synchronized and asynchronized eNBs. Further, the proposed CSM API may provide an interface for configuring one or more system parameters and one or more cell-level parameters, wherein the configured system parameters and cell-level parameters may be related to at least one of downlink (DL) signals, DL common channels, uplink (UL) signals or UL control channels.

In an aspect, the CSM API may provide an interface for performing optimized DL HARQ (Hybrid Automatic Repeat reQuest) procedure, as well as for performing optimized UL HARQ procedure. For example, a Physical Downlink Shared Channel command (PDSCH_CMD) may be sent through the interface for both new transmission and retransmission, since PDSCH may utilize asynchronized HARQ. The PDSCH_CMD may carry transport block descriptions along with resource information that may be required by L1 for transmitting transport blocks over the air on the PDSCH. The PDSCH data may pass down from L2 to L1 only once during a new transmission. For retransmission, the same data may be reused.

A Physical Uplink Shared Channel command (PUSCH_CMD) may be sent through the interface for every new transmission. The PUSCH_CMD may carry Modulation Coding Scheme (MCS) information along with resource information that may be required by L1 to decode transport blocks transmitted over the air on the PUSCH. Due to synchronized HARQ for PUSCH, if there is no parameter change, L2 may not be required to send PUSCH_CMD for retransmission. On the other hand, L1 may handle automatic retransmission process internally. In addition, only when Cyclic Redundancy Check (CRC) passes, PUSCH data may be forwarded from L1 to L2.

CSM API Message Types and Operation Scenarios

The proposed CSM API illustrated in FIG. 4 may comprise provisioning messages and MAC messages. The provisioning messages may be invoked once during a system bring-up, and it may be either eNB specific or cell specific. The MAC messages may be categorized into UE-specific messages and DL/UL MAC messages. The UE-specific messages may be triggered by call setup and teardown. The DL and UL MAC messages may be used as overhead and control messages, and may be utilized for HARQ operations.

The provisioning message types may comprise at least one of following request (REQ) messages: CSM_CONFIG_REQ, CELL_CONFIG_REQ, PCFICH_CONFIG_REQ, PHICH_CONFIG_REQ, PUCCH_CONFIG_REQ, PRACH_CONFIG_REQ, SRS_CONFIG_REQ, CSM_TUNEABLE_CONFIG_REQ, CELL_ENABLE_REQ, or CSM_TERMINATE_REQ. The CSM_CONFIG_REQ message may represent a request message for configuring eNB system parameters. The CELL_CONFIG_REQ message may be used to configure cell parameters, as well as DL common Reference Signal (RS), Primary Synchronization Signal (PSS) and Secondary Synchronization Signal (SSS). The PCFICH_CONFIG_REQ message may be utilized to configure parameters of Physical Control Format Indicator Channel (PCFICH), the PHICH_CONFIG_REQ message may configure parameters of Physical Hybrid-ARQ Indicator Channel (PHICH), the PUCCH_CONFIG_REQ message may be used for configuring Physical Uplink Control Channel (PUCCH) parameters, and the PRACH_CONFIG_REQ message may configure Physical Random Access Channel (PRACH) parameters.

Further, the SRS_CONFIG_REQ message may configure Sounding Reference Signal (SRS) cell parameters, while the CSM_TUNEABLE_CONFIG_REQ may represent a request message designed for internal system performance tuning. The CELL_ENABLE_REQ message may be utilized to set system time and enable eNB operation, and the CSM_TERMINATE_REQ message may request graceful shutdown of the system instead of power cycle.

The UE-Specific MAC message types may comprise at least one of: ADD_UE_REQ message, CFG_UE_REQ message, or DELETE_UE_REQ message. The ADD_UE_REQ message may be utilized to build one-to-one mapping between RNTI and connection ID fields. The ADD_UE_REQ may carry UE configuration values utilized by the CSM until the UE is removed from a monitoring set through the DELETE_UE_REQ command. The ADD_UE_REQ may act as an indication for L1 of a UE being added for communication in a system.

The RNTI field of the ADD_UE_REQ may comprise a temporary RNTI or Cell Radio Network Temporary Identifier (CRNTI), and may represent a unique UE identifier within a cell. For an active UE, the connection ID field of the ADD_UE_REQ may be associated with a unique CRNTI. The connection ID may be used to tag an active UE in all MAC interface messages. Thus, when a UE becomes active, the ADD_UE_REQ message may be the first message to be sent. In an aspect, only eight (least significant) bits of the connection ID field may be utilized. In this way, a range of values for connection ID may be reduced, and, hence, the number of entries in the UE database.

The CFG_UE_REQ message may be sent along with ADD_UE_REQ to complete all the UE-specific parameter configurations. While the parameters in ADD_UE_REQ may not change for the duration of call, the parameters in CFG_UE_REQ may be allowed to be updated for the duration of call.

The DELETE_UE_REQ message may command L1 to delete UE instances associated with connection IDs carried in the body of this message. Any future messages tagged with a connection ID carried in this message may be ignored until the connection ID is added again by means of the ADD_UE_REQ.

The DL MAC message types may comprise at least one of: PBCH_CMD message, PCFICH_CMD message, PHICH_CMD message, PDCCH_CMD message, PDSCH_CMD message, or PDSCH_DATA message. The PBCH_CMD message may represent Physical Broadcast Channel (PBCH) transmission carrying Master Information Block (MIB) information. The PCFICH_CMD message may represent Control Format Indicator (CFI) transmission, while the PHICH_CMD message may represent PHICH transmission carrying Acknowledgement/Negative-Acknowledgement (ACK/NACK) for Physical Uplink Shared Channel (PUSCH).

Further, the PDCCH_CMD message may represent Physical Downlink Control Channel (PDCCH) transmission carrying all Downlink Control Information (DCI) formats, and the PDSCH_CMD message may represent a message carrying transport block descriptions along with the resource information that may be required by L1 to transmit the transport blocks over the air on the Physical Downlink Shared Channel (PDSCH). In an aspect, the PDSCH_DATA message may be accompanied with the PDSCH_CMD message in order to provide content of transport blocks to be sent.

The UL MAC message types may comprise at least one of following messages: PUSCH_CMD, PUSCH_DATA, PUSCH_DEASSIGN_CMD, PRACH_DATA, UL_ACK_DATA, SR_DATA, UL_CTRL_DATA, TRACK_LOOP_DATA, or IOT_DATA. The PUSCH_CMD may carry MCS along with resource information that may be required by L1 to decode the transport blocks transmitted on the PUSCH. The PUSCH_DATA message may carry a decoded header (e.g., decoded by a Turbo decoder of L1) and a decoded bit stream for PUSCH, while the PUSCH_DEASSIGN_CMD may be utilized to terminate the HARQ process and free up L1 resources.

Further, the PRACH_DATA message may carry detected preamble and initial timing offset; the UL_ACK_DATA message may carry ACK/NAK regarding PDSCH transmission, while the SR_DATA message may carry a positive Scheduling Request (SR). In an aspect, the UL_CTRL_DATA message may carry CQI/PMI (Channel Quality Indicator/Precoding Matrix Information), and Rank Indicator (RI) data from both periodic PUCCH report and aperiodic PUCCH report, while the TRACK_LOOP_DATA message may carry signal-to-noise ratio (SNR), Transmitter Power Control (TPC) and Doppler information for at least one of PUCCH, PUSCH or SRS. In an aspect, the IOT_DATA message may carry 'interference over thermal noise' (IOT) data for each Resource Block (RB), each antenna and each transmission slot.

Figure 5:
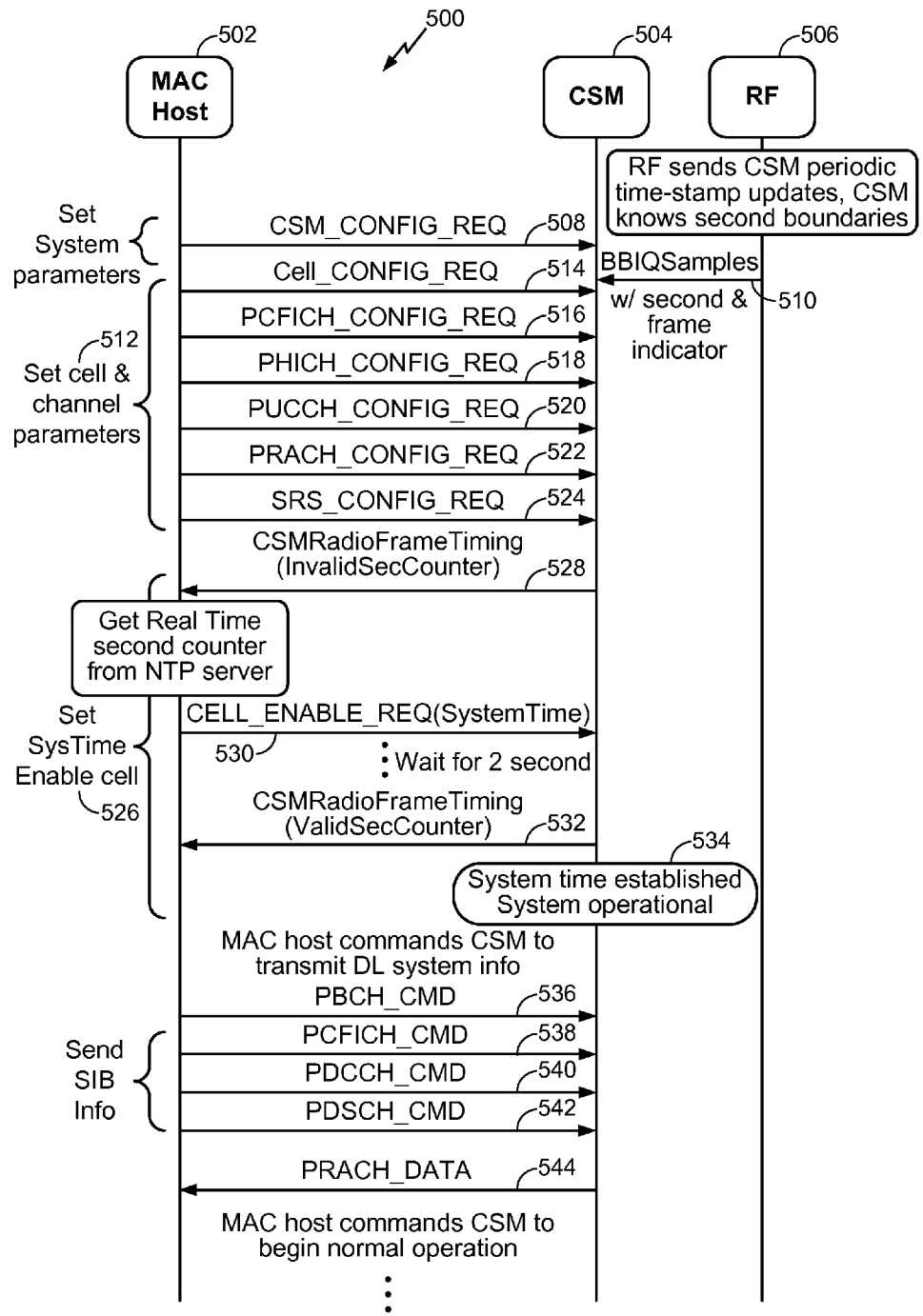
FIG. 5 illustrates an example CSM API operation scenario related to cell initialization in accordance with certain aspects of the present disclosure.

FIG. 5 illustrates an example CSM API operation scenario 500 related to initialization of eNB (cell site) in accordance with certain aspects of the present disclosure. A MAC host 502 of the eNB may set system parameters by sending a CSM_CONFIG_REQ message 508 to a CSM 504 of the eNB. A Radio Frequency (RF) frontend 506 may send to the CSM 504 periodic time-stamp updates with second and frame boundaries (e.g., baseband I and Q samples 510 with second and frame indicators, as illustrated in FIG. 5). Following this, at a time instant 512, the MAC host 502 may set cell and channel parameters by sending various aforementioned configuration commands 514-524 to the CSM 504.

At a time instant 526, the MAC host 502 may set a system time and enable eNB operation (or cell operation). After receiving a CSM Radio Frame Timing message 526 with an invalid second counter value, the MAC host 502 may obtain a real time second counter value from a Network Time Protocol (NTP) server. Then, the MAC host 502 may send to the CSM 504 a CELL_ENABLE_REQ message 530 with the valid system time. After waiting for two seconds, as illustrated in FIG. 5, the CSM 504 may send a CSM Radio Frame Timing message 532 with the valid second counter value. At 534, the system time may be established and the system (eNB) may become operational.

Following this, as illustrated in FIG. 5, the MAC host 502 may command the CSM 504 to transmit DL system information by sending DL MAC commands 536-542. Master Information Block (MIB) information may be conveyed by sending the PBCH_CMD message 536, while System Information Block (SIB) information may be conveyed by sending the PCFICH_CMD message 538, the PDCCH_CMD message 540 and the PDSCH_CMD message 542. The CSM 504 may send a PRACH_DATA message 544 to the MAC host 502, wherein the PRACH_DATA may carry a detected preamble transmitted on an UL and an initial timing offset. After receiving the PRACH_DATA, the MAC host 502 may command the CSM 504 to begin normal operation.

Figure 6:
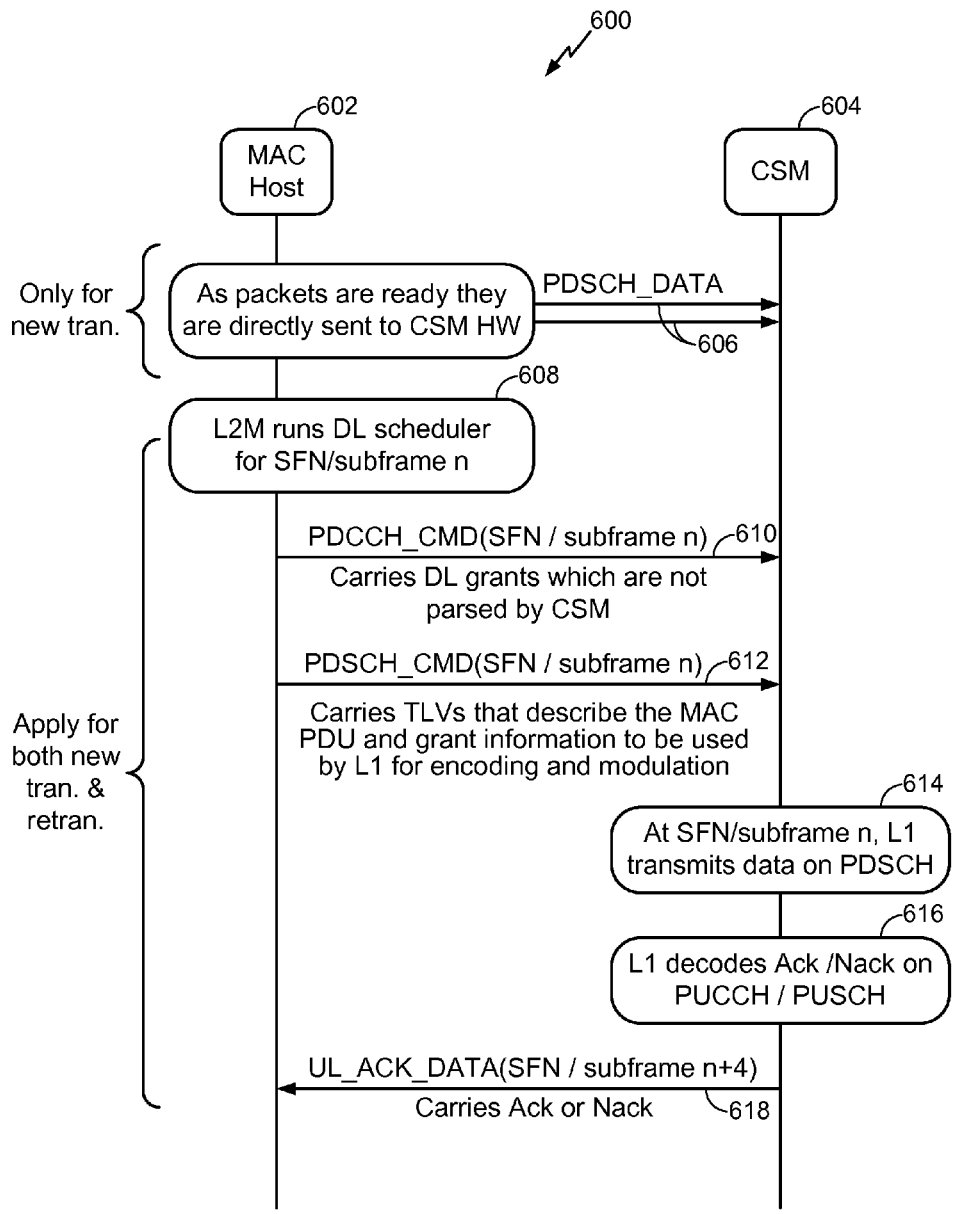
FIG. 6 illustrates an example CSM API operation scenario related to downlink data flow in accordance with certain aspects of the present disclosure.

FIG. 6 illustrates an example CSM API operation scenario 600 related to DL data flow of eNB (cell site) in accordance with certain aspects of the present disclosure. In the case of a new DL transmission, as packets are ready, they may be directly sent within a PDSCH_DATA message 606 from a MAC host 602 to a CSM 604. At a time instant 608, L2 may run a DL scheduler for a subframe n. After this, the MAC host 602 may send a PDCCH_CMD message associated with the subframe n. The PDCCH_CMD message may carry DL grants, which may not be parsed by the CSM 604. Then, the MAC host 602 may send to the CSM 604 a PDSCH_CMD message 612 associated with the subframe n. The PDSCH_CMD message 612 may carry Type Length Values (TLVs) that describe a MAC Packet Data Unit (PDU) and grant information to be used by L1 for encoding and modulation.

At a time instant 614, at the subframe n, L1 (i.e., CSM HW) may transmit data on PDSCH. At 616, L1 may decode ACK/NACK transmitted on PUCCH/PUSCH. After decoding, at a subframe n+4, the CSM 604 may send a UL_ACK_DATA message 618 that may carry ACK or NACK regarding the PDSCH transmission. It should be noted that the aforementioned operations 608-618 may be applied for both new DL transmissions and retransmissions.

Figure 7:
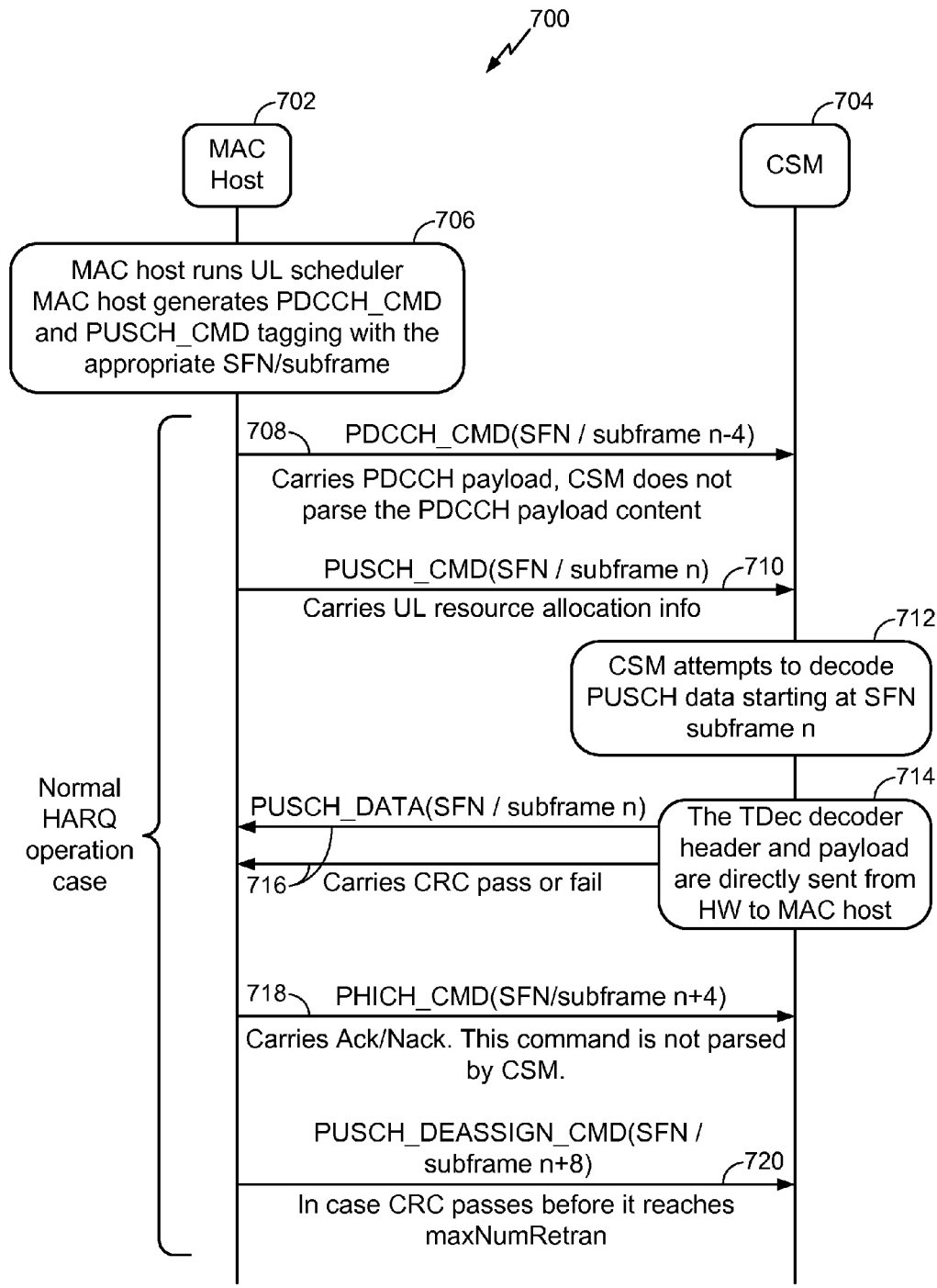
FIG. 7 illustrates an example CSM API operation scenario related to uplink data flow without retransmission in accordance with certain aspects of the present disclosure.

FIG. 7 illustrates an example CSM API operation scenario 700 related to UL data flow of eNB (cell site) without retransmission commands in accordance with certain aspects of the present disclosure. At a time instant 706, a MAC host 702 of the eNB may run an UL scheduler, and may generate PDCCH_CMD and PUSCH_CMD tagging with an appropriate sub-frame number (SFN)/subframe. After that, the MAC host 702 may send PDCCH_CMD message 708 associated with a SFN/subframe n−4 to a CSM 704 of the eNB. The PDCCH_CMD message 708 may carry a PDCCH payload, while the CSM 704 may not parse the content of PDCCH payload. Then, the MAC host 702 may send PUSCH_CMD message 710 associated with a SFN/subframe n to the CSM 704. The PUSCH_CMD message 710 may carry information about UL resource allocation and MCS, which may be required by L1 to decode transport blocks transmitted on the PUSCH.

At 712, starting at the SFN/subframe n, the CSM 704 may attempt to decode PUSCH data. At 714, a decoded header (e.g., decoded by a Turbo decoder of the CSM HW) and payload of the SFN/subframe n may be directly sent from the CSM HW to the MAC host 704 within a PUSCH_DATA message 716. The PUSCH_DATA message 716 may also carry indication whether CRC was passed or failed at the CSM HW. At a SFN/subframe n+4, the MAC host 702 may send a PHICH_CMD message 718 to the CSM 704 carrying ACK/NACK for the PUSCH. In an aspect, this command may not need to be parsed by the CSM 704. If the CRC passes before a predefined maximum number of retransmissions is reached, the MAC host 702 may send a PUSCH_DEASSIGN_CMD message 720 of a SFN/subframe n+8 to terminate HARQ process defined by the operations 708-718 and to free-up L1 resources.

Figure 8:
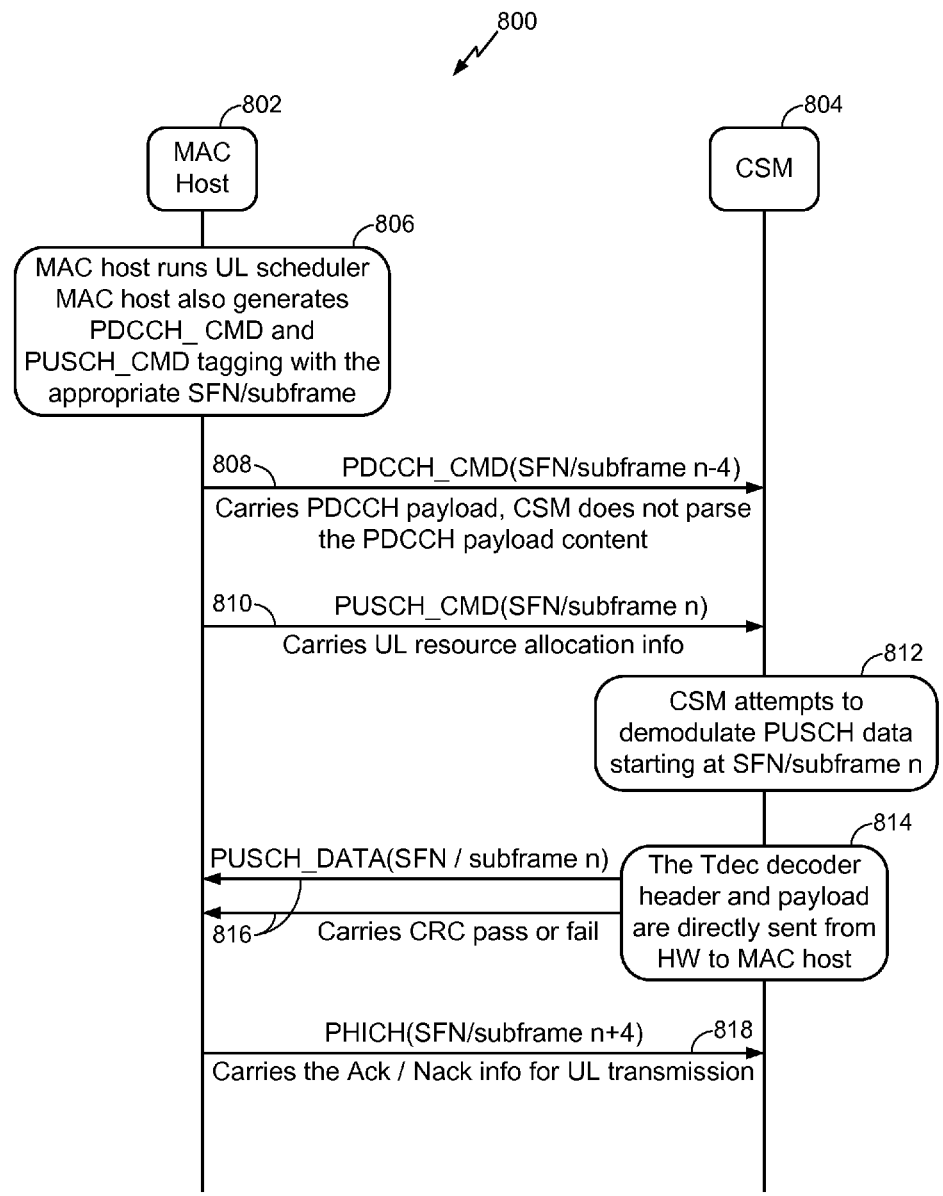
FIG. 8 illustrates an example CSM API operation scenario related to uplink data flow with retransmission in accordance with certain aspects of the present disclosure.

FIG. 8 illustrates an example CSM API operation scenario 800 related to UL data flow of eNB (cell site) with retransmission commands in accordance with certain aspects of the present disclosure. At 806, a MAC host 802 of the eNB may run an UL scheduler, and may generate PDCCH_CMD and PUSCH_CMD tagging with an appropriate SFN/subframe. After that, the MAC host 802 may send PDCCH_CMD message 808 associated with a SFN/subframe n−4 to a CSM 804. The PDCCH_CMD message 808 may carry a PDCCH payload, while the CSM 804 may not parse the content of PDCCH payload. Then, the MAC host 802 may send to the CSM 804 PUSCH_CMD message 810 associated with a SFN/subframe n. The PUSCH_CMD message 810 may carry information about UL resource allocation and MCS, which may be required by L1 to decode transport blocks transmitted on the PUSCH.

At 812, starting at the SFN/subframe n, the CSM 804 may attempt to demodulate PUSCH data. At 814, a decoded header (e.g., decoded by a Turbo decoder of the CSM HW) and payload of the SFN/subframe n may be directly sent from the CSM HW to the MAC host 804 within a PUSCH_DATA message 816. The PUSCH_DATA message 816 may also carry indication whether CRC was passed or failed at the CSM HW. At a SFN/subframe n+4, the MAC host 802 may send a PHICH_CMD message 818 to the CSM 804 carrying ACK/NACK for the PUSCH. In an aspect, this command may not be parsed by the CSM 804.

If the CRC fails, while a predefined maximum number of retransmissions is not reached and HARQ early termination does not happen, then the PUSCH_DEASSIGN_CMD may not be invoked and L1 may continue retransmitting according to one of the following two aspects. In one aspect, the CSM 804 may keep decoding attempts at the same HARQ using the same parameters except Redundancy Version (RV) until the PUSCH_DEASSIGN_CMD is received. Once the PUSCH_DEASSIGN_CMD is received at the CSM 804, the PUSCH resource may be released. In another aspect, if a new PUSCH_CMD message is received at the CSM 804, then new decoding parameters conveyed by the new PUSCH_CMD message may overwrite the original decoding parameters.

Figure 9:
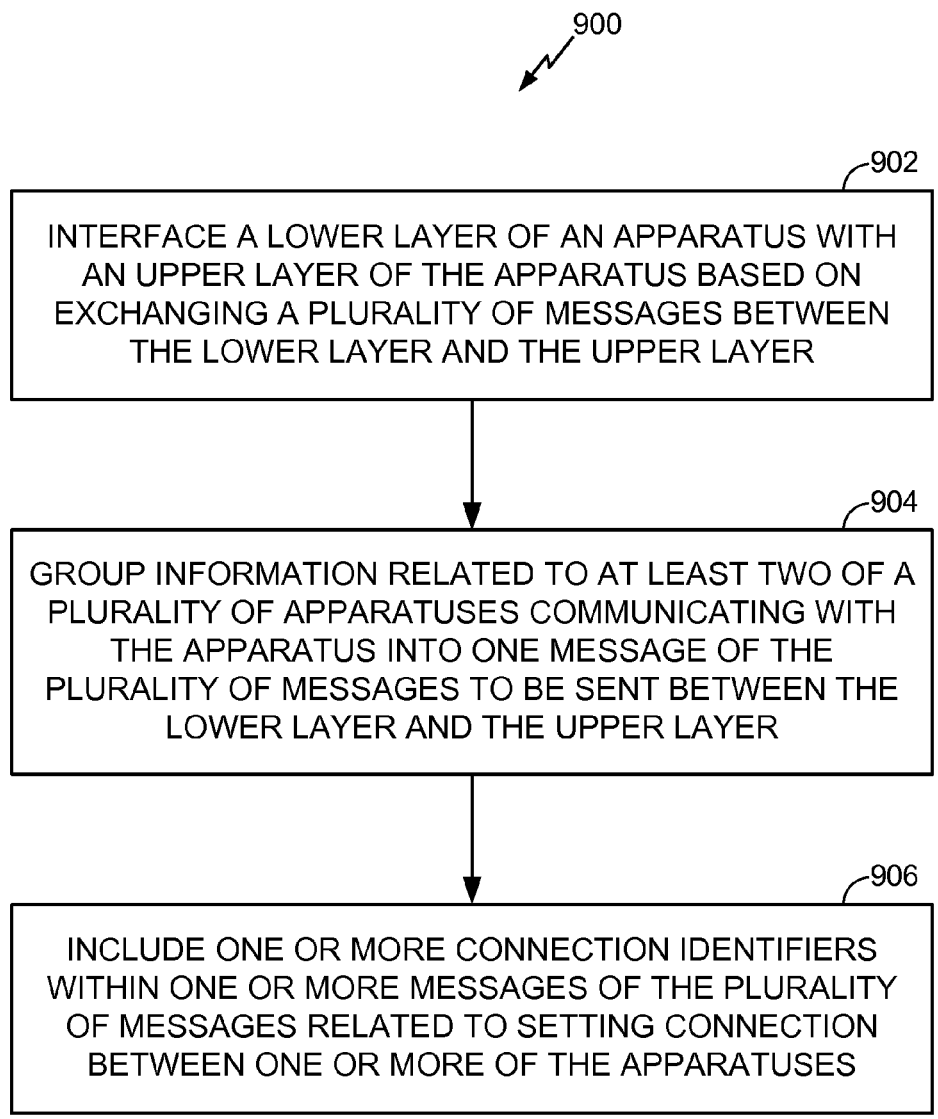
FIG. 9 is a functional block diagram conceptually illustrating example blocks that may be performed at a cell site in accordance with certain aspects of the present disclosure.

FIG. 9 is a functional block diagram conceptually illustrating example blocks 900 executed at an access point in accordance with certain aspects of the present disclosure. Operations illustrated by the blocks 900 may be executed, for example, at the processor 230 of the access point 210 from FIG. 2 and/or at the circuits 402, 404, 406 from FIG. 4.

The operations may begin, at block 902, by interfacing a lower layer of the access point with an upper layer of the access point based on exchanging a plurality of messages between the lower layer and the upper layer. At block 904, information related to at least two of a plurality of user equipments communicating with the access point may be grouped into one message of the plurality of messages to be sent between the lower layer and the upper layer. At block 906, one or more connection identifiers may be included within one or more messages of the plurality of messages related to setting connection between one or more of the user equipments and the access point.

In an aspect, each of the connection identifiers may be associated with the connection of a unique apparatus (user equipment) of the plurality of user equipments. In an aspect, the interfacing may comprise transferring, between the lower layer and the upper layer in response to communication between the access point and at least one of the user equipments, one or more Acknowledgement/Negative-Acknowledgement (ACK/NACK) messages of the plurality of messages.

In one configuration, the apparatus 210 for wireless communication includes means for interfacing a lower layer of the apparatus with an upper layer of the apparatus based on exchanging a plurality of messages between the lower layer and the upper layer, means for grouping information related to at least two of a plurality of other apparatuses communicating with the apparatus into one message of the plurality of messages to be sent between the lower layer and the upper layer, and means for including one or more connection identifiers within one or more messages of the plurality of messages related to setting connection between one or more of the other apparatuses and the apparatus 210. In one aspect, the aforementioned means may be the processor 230 configured to perform the functions recited by the aforementioned means. In another aspect, the aforementioned means may be a module or any apparatus configured to perform the functions recited by the aforementioned means.

The proposed implementation of CSM API has several benefits. It may speed up the LTE base station modem technology transfer process. Further, it may be adopted into fourth generation (4G) femto chipset products. The proposed CSM API may provide optimized solutions for the distributed messaging architecture, and it may be easily adapted to the traditional shared memory/bus/interrupt based architecture.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for communications, comprising:
    interfacing a lower layer of an apparatus with an upper layer of the apparatus based on exchanging a plurality of messages between the lower layer and the upper layer;
    grouping information related to at least two of a plurality of apparatuses communicating with the apparatus into one message of the plurality of messages to be sent between the lower layer and the upper layer;
    including one or more connection identifiers within one or more messages of the plurality of messages related to setting connection between one or more of the apparatuses and the apparatus, wherein a range of values of the connection identifiers is chosen in an effort to reduce a number of entries in a database associated with the plurality of apparatuses; and
    establishing one-to-one mapping between one of the connection identifiers and a Radio Network Temporary Identifier (RNTI), wherein that connection identifier and the RNTI are stored in one of the messages.

2. The method of claim 1, wherein the interfacing comprises:
    reducing duplication of functions between the lower layer and the upper layer.

3. The method of claim 1, wherein the interfacing comprises:
    skipping resending a message conveying data, of the plurality of messages, if the data conveyed with the message is unchanged from last time the message was sent between the lower layer and the upper layer.

4. An apparatus for communications, comprising:
    an interfacing circuit configured to interface a lower layer of the apparatus with an upper layer of the apparatus based on exchanging a plurality of messages between the lower layer and the upper layer, wherein
    the interfacing circuit is also configured to group information related to at least two of a plurality of apparatuses communicating with the apparatus into one message of the plurality of messages to be sent between the lower layer and the upper layer,
    the interfacing circuit is also configured to include one or more connection identifiers within one or more messages of the plurality of messages related to setting connection between one or more of the apparatuses and the apparatus, wherein a range of values of the connection identifiers is chosen in an effort to reduce a number of entries in a database associated with the plurality of apparatuses; and
    a circuit configured to establish one-to-one mapping between one of the connection identifiers and a Radio Network Temporary Identifier (RNTI), wherein that connection identifier and the RNTI are stored in one of the messages.

5. The apparatus of claim 4, wherein:
    the interfacing circuit is also configured to reduce duplication of functions between the lower layer and the upper layer.

6. The apparatus of claim 4, wherein:
    the interfacing circuit is also configured to skip resending a message conveying data, of the plurality of messages, if the data conveyed with the message is unchanged from last time the message was sent between the lower layer and the upper layer.

7. An apparatus for communications, comprising:
    means for interfacing a lower layer of the apparatus with an upper layer of the apparatus based on exchanging a plurality of messages between the lower layer and the upper layer;
    means for grouping information related to at least two of a plurality of apparatuses communicating with the apparatus into one message of the plurality of messages to be sent between the lower layer and the upper layer;
    means for including one or more connection identifiers within one or more messages of the plurality of messages related to setting connection between one or more of the apparatuses and the apparatus, wherein a range of values of the connection identifiers is chosen in an effort to reduce a number of entries in a database associated with the plurality of apparatuses; and
    means for establishing one-to-one mapping between one of the connection identifiers and a Radio Network Temporary Identifier (RNTI), wherein that connection identifier and the RNTI are stored in one of the messages.

8. The apparatus of claim 7, wherein the means for interfacing comprises:
    means for reducing duplication of functions between the lower layer and the upper layer.

9. The apparatus of claim 7, wherein the means for interfacing comprises:

means for skipping resending a message conveying data, of the plurality of messages, if the data conveyed with the message is unchanged from last time the message was sent between the lower layer and the upper layer.

10. A non-transitory computer-readable medium comprising code, the code when executed by a computer causing the computer to:
- interface a lower layer of an apparatus with an upper layer of the apparatus based on exchanging a plurality of messages between the lower layer and the upper layer;
- group information related to at least two of a plurality of apparatuses communicating with the apparatus into one message of the plurality of messages to be sent between the lower layer and the upper layer;
- include one or more connection identifiers within one or more messages of the plurality of messages related to setting connection between one or more of the apparatuses and the apparatus; and
- establish one-to-one mapping between one of the connection identifiers and a Radio Network Temporary Identifier (RNTI), wherein that connection identifier and the RNTI are stored in one of the messages.

11. The non-transitory computer-readable medium of claim 10, the code when executed by the computer further causing the computer to:
- reduce duplication of functions between the lower layer and the upper layer.

12. The non-transitory computer-readable medium of claim 10, the code when executed by the computer further causing the computer to:
- skip resending a message conveying data, of the plurality of messages, if the data conveyed with the message is unchanged from last time the message was sent between the lower layer and the upper layer.

13. An apparatus for communications, comprising:
- at least one processor; and
- a memory coupled to the at least one processor,
- wherein the at least one processor is configured to
- interface a lower layer of the apparatus with an upper layer of the apparatus based on exchanging a plurality of messages between the lower layer and the upper layer,
- group information related to at least two of a plurality of apparatuses communicating with the apparatus into one message of the plurality of messages to be sent between the lower layer and the upper layer,
- include one or more connection identifiers within one or more messages of the plurality of messages related to setting connection between one or more of the apparatuses and the apparatus, and
- establish one-to-one mapping between one of the connection identifiers and a Radio Network Temporary Identifier (RNTI), wherein that connection identifier and the RNTI are stored in one of the messages.

14. The apparatus of claim 13, wherein the at least one processor is also configured to
- reduce duplication of functions between the lower layer and the upper layer.

15. The apparatus of claim 13, wherein the at least one processor is also configured to
- skip resending a message conveying data, of the plurality of messages, if the data conveyed with the message is unchanged from last time the message was sent between the lower layer and the upper layer.

* * * * *